Figure 1:
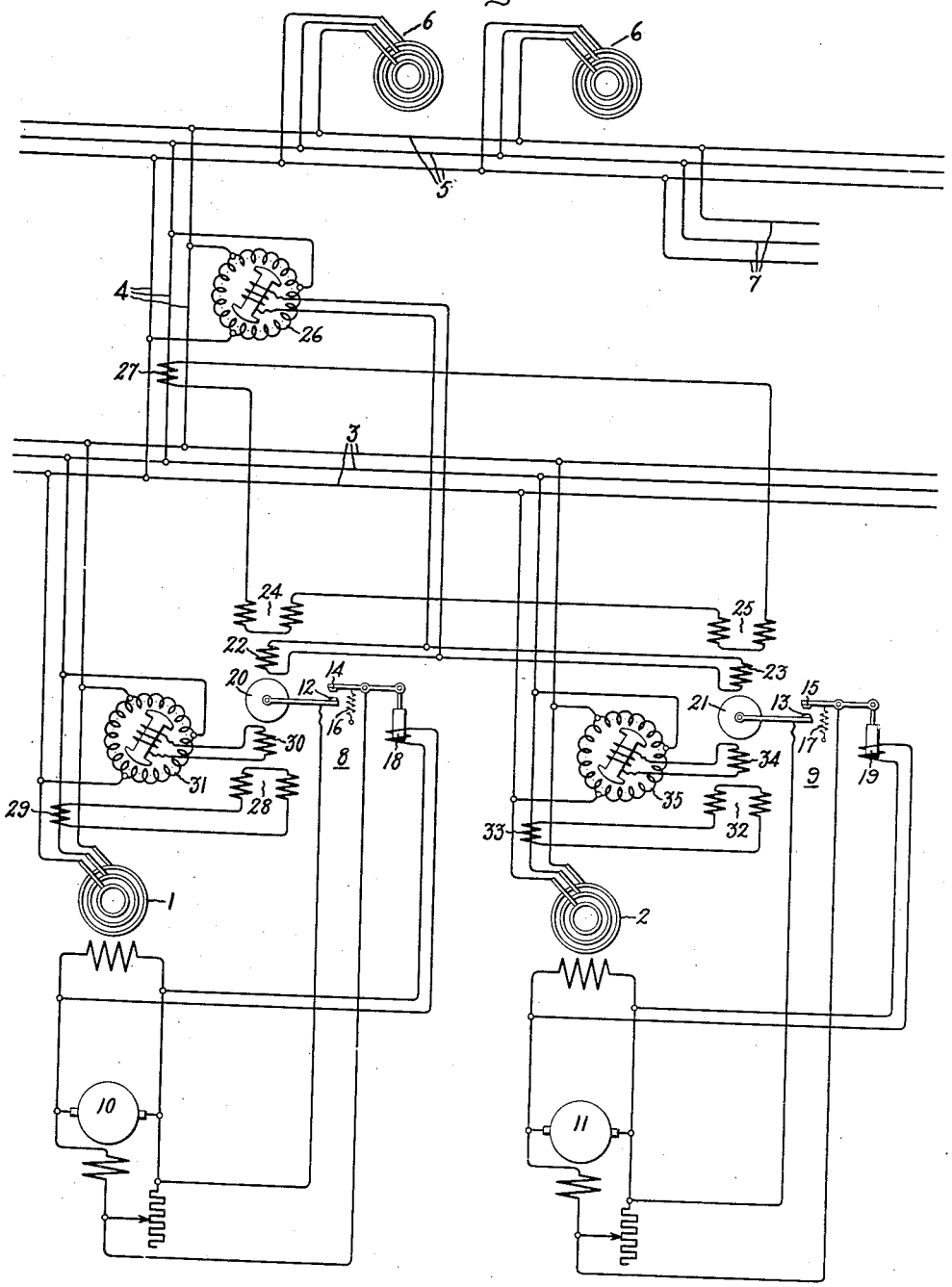

Inventor:
Karl H. May,
by Harry E. Dunham
His Attorney.

Patented July 23, 1935

2,009,115

UNITED STATES PATENT OFFICE 2,009,115

ELECTRICAL REGULATION

Karl H. May, Berlin-Friedenau, Germany, assignor to General Electric Company, a corporation of New York Application October 13, 1933, Serial No. 693,458
In Germany November 9, 1932

10 Claims. (Cl. 172—246)

My invention relates to electrical regulation and more particularly to the automatic regulation of parallel connected alternating current dynamo electric machines with respect to power factor or reactive power.

For purposes of understanding the present invention, a sufficiently clear understanding of the terms power factor and reactive power may be had from the following simple but rather crude mechanical analogy. Every one knows that the best way to utilize a force to move an object, whose path of motion is restricted to a particular direction, is to apply the force directly in line with this direction. If the force is applied at an angle, part of it is wasted in trying to move the object out of its only possible path of movement and, as this is impossible, that portion of the force performs no real or useful work. Applying this analogy to an alternating current system, the ratio of the component of the force which is in line with the path of motion of the object to the actual force applied to the object corresponds to electrical power factor, while the component of the total force which is trying to push the object out of its line of motion corresponds to electrical reactive power. In alternating current systems, power factor and reactive power occur because the current and voltage waves can get out of time phase, as measured in angular degrees on the basis of 360 degrees for a complete cycle, and power factor may be considered as the cosine of the angle of phase displacement while reactive power may be considered as the volt-amperes times the sine of the angle of phase displacement. In terms of the angle of application of the mechanical force, the "power factor" of the mechanical system is the cosine of this angle, while the "reactive power" is the actual force times the sine of this angle. Volt-amperes is the product of the voltage of the electrical system and its current in amperes and corresponds to the actual force of the mechanical system. The practical opposite of reactive power is watts or real power. In the electrical system this is the volt-amperes times the power factor, which explains the name of this latter term. In the mechanical analogy it is the component of the total force which is in line with the motion and which does real work and this portion of the total force is equal to the total force times the cosine of its angle of application.

There are many reasons why it may often be desirable to regulate the power factor or reactive power of alternating current systems. One of the commonest reasons is that low power factor, which usually corresponds to high reactive power, represents waste and uneconomical use of the real power capacity of an alternating current system.

In accordance with my invention I provide a novel regulating system which can be made to respond to the power factor of or the reactive power flow in, a circuit and which simultaneously regulates a plurality of parallel connected alternating current machines connected to said circuit in such a manner as to maintain the power factor, or reactive power, at any desired value. In addition, my system includes individual means associated with each machine and arranged to respond to the power factor, or reactive power, of their associated machines for stabilizing the regulating system and insuring proper individual power factors or reactive powers of the machines.

My invention is applicable to any suitable types of alternating current machines, such as synchronous machines or Scherbius sets and it is immaterial whether the machines act as motors or generators.

An object of my invention is to provide a new and improved electrical regulating system.

Another object of my invention is to provide a new and improved power factor regulating system for parallel alternating current machines.

An additional object of my invention is to provide a new and improved system for regulating the reactive power of parallel connected alternating current machines.

My invention will be better understood from the following description taken in connection with the accompanying drawings and its scope will be pointed out in the appended claims.

Figure 2:
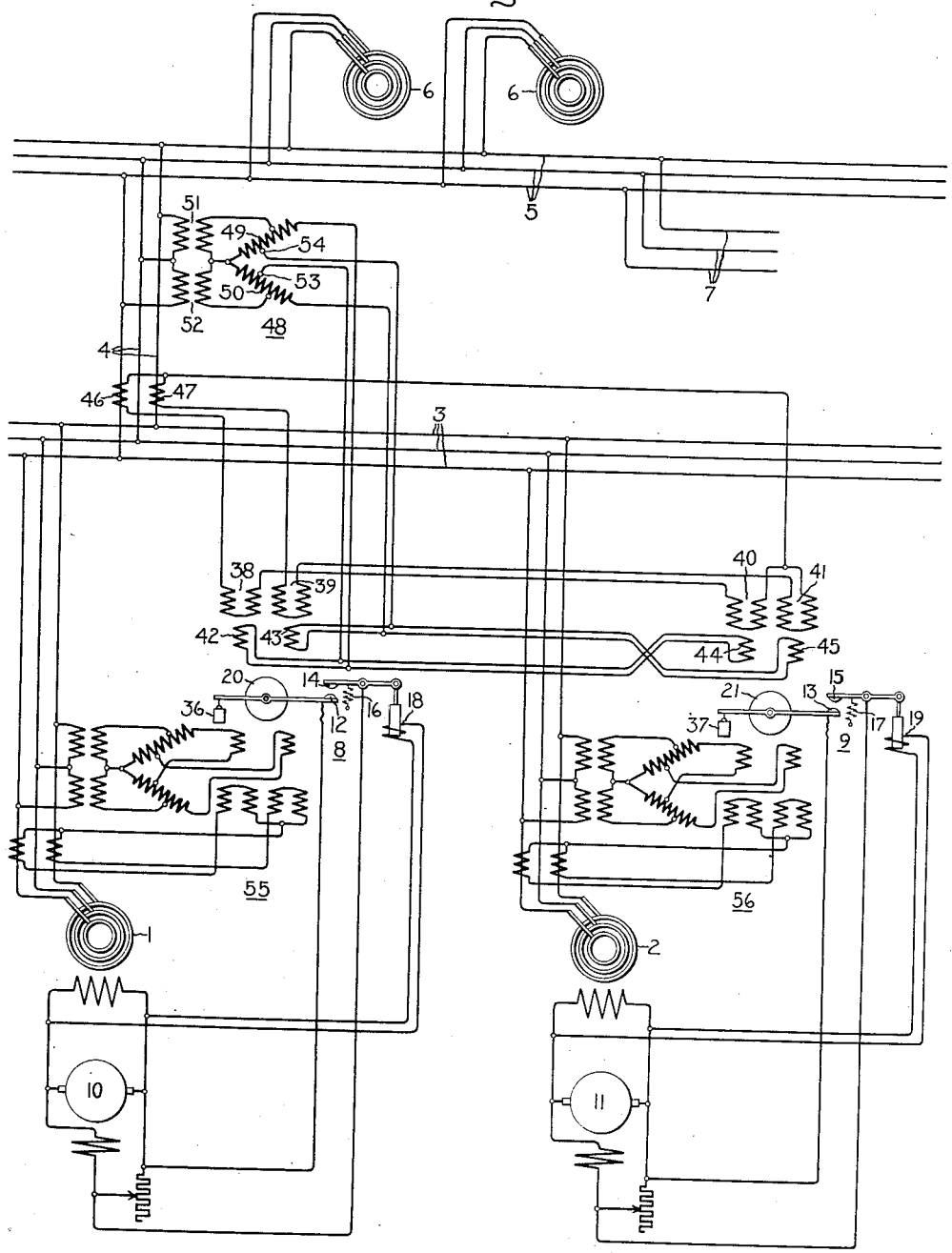
Figure 3:
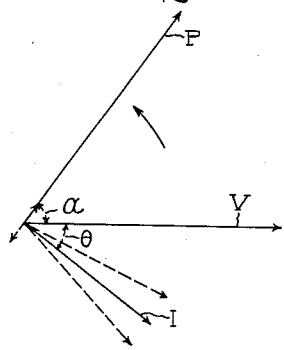
Figure 4:
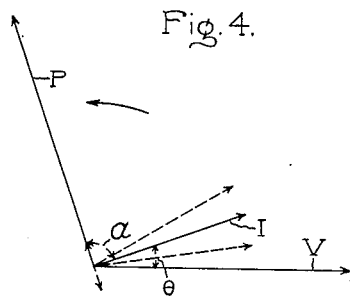
Figure 5:
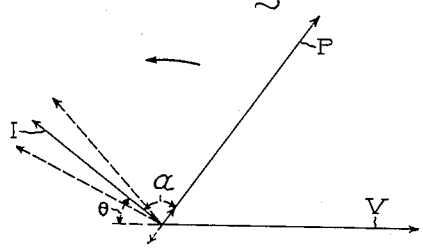
Figure 6:
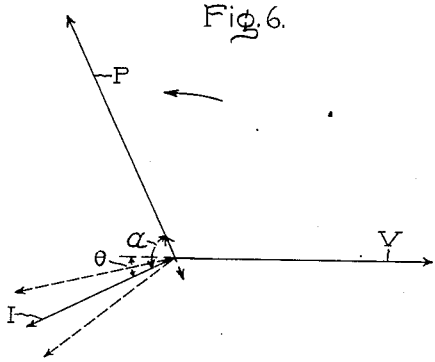
Figure 7:
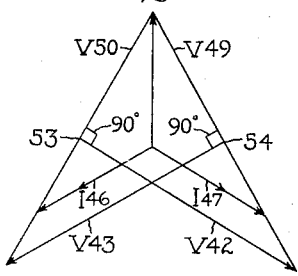

In the drawings, in which like reference characters are applied to similar elements throughout the several figures, Fig. 1 is a diagrammatic showing of an embodiment of my invention as adapted to the regulation of the power factor of a balanced polyphase system, Fig. 2 is a similar showing of my invention as adapted to regulate the reactive power in a polyphase system which may operate under unbalanced phase conditions, Fig. 3 is a vector diagram illustrating the operation of Fig. 1 when the alternating current machines are operating as generators carrying lagging current, Fig. 4 is a vector diagram illustrating the operation of Fig. 1 when the alternating current machines are operating as generators carrying leading current, Fig. 5 is a vector diagram illustrating the operation of Fig. 1 when the alternating current machines are operating as motors which carry lagging current, Fig. 6 is a vector diagram of the operation of Fig. 1 when the dynamo electric machines are operating as over-excited motors carrying leading current, and Fig. 7 is a vector diagram illustrating current and voltage relations of a phase shifting transformer which is used in connection with the system illustrated in Fig. 2.

Referring now to Fig. 1 of the accompanying drawings, I have shown my invention as applied to a pair of alternating current machines 1 and 2 which are connected in parallel to a common bus 3. Connected to bus 3 is a power circuit or tie-line 4 which connects to another bus 5 to which are connected a plurality of alternating current machines 6. A load circuit or transmission line 7 is connected to the bus 5. Although I have illustrated a three-phase system it should be understood that my invention is entirely independent of the number of phases of the alternating current system. It will be assumed for the purposes of detailed explanation that machines 1 and 2 are synchronous generators which constitute a power station or a part of a power station and which are under contract or agreement with the power station including the machines 6 to supply power over the tie-line 4 at constant power factor. It is assumed that the main load on all of the machines is taken off through the circuit 7.

Generators 1 and 2 are provided with automatic regulators 8 and 9, respectively, for controlling their excitation. Regulators 8 and 9 may be of any suitable type, that is to say, they may have any well-known operating principle and, as shown, these regulators are of the well-known vibratory contact type. So far as my invention is concerned, regulators 8 and 9 may control directly the excitation of their associated machines although as a practical matter it is preferable to have the regulators act indirectly through control of the excitation of a pair of exciters 10 and 11, respectively, which are arranged respectively to excite the generators 1 and 2. Regulators 8 and 9 are provided respectively with main control contacts 12 and 13, anti-hunting contacts 14 and 15, restraining springs 16 and 17 for the anti-hunting contacts, and anti-hunting magnets 18 and 19 connected to respond respectively to the voltage of exciters 10 and 11.

The operation of a vibratory contact regulator is well-known to those skilled in the art so that this operation will only be described very briefly as follows: As its name implies the action of such a regulator is vibratory or pulsatory in character and it acts to hold a substantially mean or average value of exciter voltage which voltage fluctuates rapidly and periodically about this value. This does not produce any appreciable pulsation in the voltage of the main regulated machine due mainly to the inductance of its field winding which acts to smooth out the pulsations of field current which tend to be produced by the pulsatory nature of the exciter voltage. The mean value of exciter voltage held by the regulator depends upon the position of its main control contact. The higher this contact is, as viewed in the drawings, the higher the excitation, while the lower this contact is the lower the excitation. The intermittent action is produced by the rapid vibratory motion of the anti-hunting contact 14. This action is caused as follows: Assume the main control contact to be stationary and its anti-hunting contact in engagement with it. Under these circumstances, the two contacts are arranged so as to produce maximum exciter excitation in any suitable manner such, for example, as by short circuiting a series resistor in the field circuit of the exciter. Consequently, the exciter voltage builds up and this increases the energization of the anti-hunting magnet until its pull is strong enough to overcome the pull of the restraining spring whereupon the anti-hunting contact leaves the main control contact. As soon as this takes place, resistance is inserted in the exciter field and its voltage drops rapidly thereby weakening the pull of the anti-hunting magnet to such a value that the restraining spring pull overcomes the pull of the magnet and the contacts again come in to engagement. This action is repeated periodically at a rapid rate. If now the main control contact should move upwardly it requires a stronger mean value of current energization of the anti-hunting magnet to cause the anti-hunting contact to leave the main control contact because of the fact that the restraining spring will be under greater tension. Consequently, this implies that a higher mean value of exciter voltage will be held and consequently a higher mean value of excitation of the regulated machine will be held. Similarly, if the main control contact moves downwardly, the restraining spring will be under less tension and consequently the mean value of the energization of the anti-hunting magnet need be less to cause the required vibratory action and consequently the excitation which it holds will be less.

Regulators 8 and 9 are each provided with main control devices which are illustrated in the form of watt-metric type torque producing elements. By the term watt-metric torque producing device I mean a device which produces a torque which varies with the current, the voltage and a function of the phase angle between the current and voltage of a circuit or machine. As shown, these elements comprise respectively inductor armature members 20 and 21 and field magnet members comprising potential windings 22 and 23 and current windings 24 and 25. The potential windings 22 and 23 are energized in accordance with the voltage of the tie-line 4 by means of a combined potential transformer and phase shifter 26. This device consists merely of a transformer having a three-phase primary winding and a relatively rotatable single phase secondary winding. With such an arrangement it is possible to vary the phase of the secondary voltage by rotating the secondary winding through any given angle. The current windings 24 and 25 are energized in accordance with the current in tie-line 4 by connecting them in series to a current transformer 27. In addition to the above described torque producing element each of the regulators is also provided with an additional and preferably similar wattmetric type torque producing element which for the sake of simplicity may be made to act on the armature member of the above described torque producing elements so that this armature member is common to the two elements, thus eliminating one such armature member. As shown, regulator 8 is provided with an additional wattmetric type field structure comprising current coil 28 connected to respond to the current of generator 1 by means of a current transformer 29 and potential winding 30 connected to respond to the voltage of generator 1 by means of a combined potential transformer and phase shifter 31, similar to element 26. Likewise, regulator 9 has a wattmetric type field structure comprising current winding 32 connected to respond to the current of generator 2 through a current transformer 33 and a potential winding 34 connected to respond to the voltage of generator 2 by means of a combined potential transformer and phase shifter 35.

The operation of Fig. 1 is as follows: Assume that generators 1, 2 and 6 are being driven by suitable prime movers (not shown) and that these generators are supplying energy to load circuit 7. Assume further that it is desired to maintain 0.8 power factor lagging, for example, on circuit 4, and that each of machines 1 and 2 is operating at 0.8 power factor lagging. Under these conditions, the phase shifters 26, 31 and 35 are so adjusted that their associated wattmetric torque producing elements produce no torque. This can easily be done by adjusting the phase of the voltage of the various torque elements so that it will be in quadrature with the current of these elements when the power factor of circuit 4, and of machines 1 and 2, is 0.8 lagging.

This condition has been illustrated in the vector diagram of Fig. 3 in which the vector V is the terminal voltage of machines 1 and 2, as well as the voltage of circuit 4, the vector I may be considered either the current of machines 1 or 2 or the current in circuit 4, and may also be considered the current in the current windings 24, 25, 28, and 32 of the wattmetric devices, while the vector P is the potential produced by the phase shifters 26, 31 and 35 and which is applied to the potential windings 22, 23, 30 and 34 of the wattmetric devices. As shown, the current I is lagging the voltage V by an angle $\theta$ whose cosine is approximately 0.8, while the potential P makes an angle $\alpha$ with the voltage V such that the sum of the two angles $\theta$ and $\alpha=90$ degrees. Consequently, as the potential and current vectors P and I are in quadrature, the various wattmetric elements are producing no torque.

Assume now that the characteristics of the load connected to the circuit 7 change in such a manner that the power factor of circuit 4 becomes 0.9 lagging, for example. Under these circumstances, the wattmetric elements responsive to the power factor of circuit 4 are arranged to produce counterclockwise torques on their rotatable armature members 20 and 21 respectively, thereby causing the main control contacts 12 and 13 to move upwardly. Also, the individual wattmetric devices 28—30 and 32—34 are so connected and adjusted that at the same time they will produce aiding or cumulative torques with respect to the torques of the elements 22—24 and 23—25, respectively, which respond to the power factor of circuit 4. This action is illustrated in Fig. 3, for if the current becomes less lagging, as shown by the dashed current vector making a smaller angle than $\theta$ with the voltage V, this current will have a component which is in phase with the potential P, with the result that the wattmetric devices produce an operating torque and by proper construction and connection of the elements of these devices this torque may be made counterclockwise. As previously explained, the motion of the main control contacts caused by counterclockwise torque will cause an increase in excitation of machines 1 and 2, thereby decreasing their power factor.

If the speed of action of the two regulators and the rate of change of excitation of the two generators is the same, this action will continue until the power factor of circuit 4 returns to 0.8 at which time the torque on the main control elements become zero and the system operates as before. However, as a practical matter, it is not possible to make the two systems operate at exactly the same rate and consequently one generator will have its excitation changed faster than the other. This will produce a very low power factor circulating current between the machines 1 and 2 and the individual wattmetric torque producing elements associated with the two machines are so connected that they will produce opposite effects on their respective regulators as a result of this circulating current. Thus, for example, if the excitation of generator 1 exceeds the excitation of generator 2, the circulating current will be lagging with respect to machine 1 and leading with respect to machine 2 and the individual wattmetric devices are so arranged that the torque produced by the device associated with machine 1 in response to this circulating current is clockwise, that is to say, it opposes the action of the wattmetric device responsive to the power factor in circuit 4, whereas the individual wattmetric device responsive to the power factor of generator 2 will produce a torque in response to this current which will aid the wattmetric element which is responsive to the power factor of circuit 4. This action of the individual wattmetric elements in producing reverse torques depending upon whether the current is of low power factor leading or low power factor lagging will be seen more readily by reference to Fig. 3. Thus, if the current vector I is advanced counterclockwise to a position where it is leading and at low power factor it will be substantially in phase with the potential P thereby causing the wattmetric element carrying this current which is the element associated with machine 2, to produce a counterclockwise torque thereby to aid the torque of the main wattmetric element of the regulator and increase the speed of action of this regulator. Similarly, if the current vector I is turned clockwise to a position of low power factor lagging, it will be substantially in phase opposition with the potential P thereby producing a reverse torque in the individual wattmetric element or regulator 8 of machine 1 and this reverse torque being clockwise will oppose the torque of the main control element of the regulator and will decrease the excitation as held by regulator 8. As a result, these individual elements stabilize the regulating system in that they tend to equalize the effects produced by both regulators. Consequently, the system will be stable and will finally reach equilibrium when the power factor of each machine and of circuit 4 returns to a predetermined regulated value such, for example, as 0.8 lagging.

For a decrease in lagging power factor on circuit 4, that is to say, when the angle of lag of the current in this circuit increases, the action is just the reverse of that which has previously been described and the wattmetric torque producing elements will produce clockwise torques thereby producing a decrease in excitation and increasing the power factor to the regulated value. Thus, it will be seen from Fig. 3 that, whenever the current I increases the angle of lag, a current component will be produced which is in phase opposition with the potential P and this component cooperating with the potential P will result in a clockwise torque being produced by the wattmetric elements of the regulators.

Fig. 4 illustrates the current and voltage when the generators are operating with a leading power factor and this figure also illustrates how the phase shifters would be adjusted to produce the proper phase angle for the potential P for the particular condition of leading power factor shown. In this figure, the current vector I illustrates the current at the regulated power factor and with this power factor no torque is produced by the wattmetric elements because no component of this current is in phase or in phase opposition with the potential P. However, if the phase angle increases and the current becomes more leading and the power factor decreases, an in-phase current component is produced and this will produce a counter-clockwise torque in the wattmetric elements which in turn will increase the excitation of the machines 1 and 2 which is necessary in the case of generators in order to reduce the phase angle of a leading current. Similarly, if the current becomes less leading and the power factor increases a current component which is in phase opposition to the potential P is produced, thereby reversing the torque of the wattmetric elements which results in the regulators decreasing the excitation of the generators 1 and 2 whereby the power factor will be restored to the regulated value.

In the case of motor operation, no change in connections or adjustment of the regulators is needed for the same value of regulated power factor, and they will automatically increase the excitation with increases in leading power factor and decrease the excitation with decreases in leading power factor which is just the opposite of the case for generators.

The various current and voltage relations and the action of the regulating system of Fig. 1 when the machines 1 and 2 act as motors is more clearly shown in Figs. 5 and 6. Figs. 5 shows the operation when the machines are operating as motors with lagging current or power factor. In this figure the vector V is the counter voltage at the terminals of the motor and this voltage is exactly equal and opposite to the voltage applied to the terminals of the motor. The current I will thus be lagging the voltage drop across the motor and, as shown, if the current becomes more lagging and the power factor decreases, a current component in phase with the potential P will be produced thereby causing the regulators to increase the excitation which acts in the case of a motor to cause the current to advance in phase. Similarly, if the current advances its phase beyond the regulated phase angle a current component will be produced which is in phase opposition to the potential P and this will cause the regulators to decrease the excitation of the motors thereby restoring the current to the proper phase angle.

In Fig. 6 the motors are operating with leading currents or power factors and if the current becomes more leading, the current component produced will cause the regulators to reduce the excitation whereas if the current becomes less leading the torque produced by the wattmetric elements will be such as to increase the excitation whereby the proper phase angle is restored.

By proper adjustment of the individual wattmetric responsive elements any desired relation of individual power factors of the machines 1 and 2 may be obtained, this adjustment being made by means of the phase shifters 31 or 35, for example, so that their wattmetric elements will produce no torques at different power factors.

If it is desired to operate Fig. 1 as a reactive power regulating system, it is only necessary to adjust the phase shifters 26, 31 and 35, in such a way that the potential P applied to the potential windings of the wattmetric devices will be in quadrature with the voltage V, and apply a suitable biasing force to the inductor members 20 and 21. The magnitude of this biasing force will determine the magnitude of the reactive power which is held constant and the direction of this biasing force will determine whether or not the reactive power is a result of a leading or lagging current component. This, if the bias is clockwise the torque of the wattmetric devices will have to be counter-clockwise to balance the biasing force or torque and a counter-clockwise torque of the wattmetric devices will correspond to reactive power produced by leading current in generators and lagging current in motors whereas if the biasing torque is counter-clockwise the regulating system will hold a reactive power which is produced by a lagging current in generators and a leading current in motors.

However, the wattmetric devices of Fig. 1 are single phase devices and they are so connected to the machines and to the circuit 4 that they will only give a true indication of reactive power when the phase conditions on the machines and the circuit 4 are balanced. As a fact, this is very often not the case and consequently I have shown in Fig. 2 a more practical arrangement for regulating for a constant value of reactive power.

Referring now to Fig. 2 it will be seen that this figure differs from Fig. 1 mainly in that the regulators 8 and 9 are provided with suitable biasing means such as the weights 36 and 37 respectively. As shown, these weights 36 and 37 are arranged to produce counterclockwise torques on the rotor members 20 and 21 but if desired these weights might be connected so that they would produce clockwise torques. The other difference between Fig. 1 and Fig. 2 is that the wattmetric devices consist of double elements instead of single elements. These double elements correspond to the elements of polyphase watt meters and the windings responsive to the current in circuit 4 are windings 38 and 39 for regulator 8 and current windings 40 and 41 for regulator 9. In addition, potential windings 42 and 43 cooperating respectively with current windings 38 and 39 are provided for regulator 8 and potential windings 44 and 45 cooperating respectively with current windings 40 and 41 of regulator 9 are provided. Current windings 38 and 40 are connected in series to respond to the current in one of the conductors of circuit 4 by means of a suitable current transformer 46 and current windings 39 and 41 are connected in series to respond to the current in another one of the conductors of circuit 4 by means of a suitable current transformer 47.

The potential windings 42, 43, 44 and 45 are connected to respond to the voltage of circuit 4 by means of a phase shifting transformer arrangement 48, which is old and well known in the metering art, comprising a V or open delta auto-transformer having windings 49 and 50 connected respectively to be energized by potential transformers 51 and 52 which are connected respectively between the conductors in which the current transformers 46 and 47 are connected and the third conductor of this circuit. The purpose of the arrangement 48 is to produce voltages for the potential windings which are in quadrature with the voltages which are usually applied to the potential windings of a polyphase wattmeter. In order to have the wattmetric devices respond to the reactive power it is necessary to apply voltages to the potential windings which are in quadrature with the usual voltages applied to these windings, which usual voltage is 30° out of phase with the current of the current windings at unity power factor. As shown, the potential windings 42 and 44 are connected in parallel between the outer terminal of the winding 49 and the mid-point 53 of the winding 50. Similarly, the potential windings 43 and 45 are connected in parallel between the outer terminal of the winding 50 and the mid-point 54 of the winding 49.

Fig. 7 shows how by properly proportioning the windings 49 and 50 the proper voltages may be obtained from the arrangement 48. Thus the vectors $I_{46}$ and $I_{47}$ represent the phase currents in the current transformers 46 and 47 respectively, at unity power factor. The vectors $V_{49}$ and $V_{50}$ represent the voltages of the windings 49 and 50 respectively, while the voltages $V_{42}$ and $V_{43}$ represent the voltages which are applied to the potential windings 42 and 43 and consequently also to windings 44 and 45 respectively. As will be seen these latter voltages are in quadrature, respectively, with the voltages $V_{50}$ and $V_{49}$, which voltages correspond to the line to line voltages of the circuit 4.

The wattmetric devices thus far described for Fig. 2 are polyphase reactive power responsive devices and they may be arranged to produce torques in either direction which are proportional to the reactive power flow in circuit 4. For purposes of illustration it will be assumed that they produce counter-clockwise torques so as to oppose the bias of weights 36 and 37, when the current is lagging.

The regulators 8 and 9 are also provided with individual polyphase reactive power responsive devices connected to respond respectively to the reactive power flow in machines 1 and 2. These devices are identical with the devices which have been previously described and which are responsive to the total reactive power and consequently these entire assemblies will merely be designated as individual reactive power responsive devices 55 and 56. For purposes of explanation it will be assumed that these devices produce counter-clockwise torques when the reactive power in machines 1 and 2 is produced by lagging currents.

The operation of the arrangement in Fig. 2 is as follows: If the biasing weights 36 and 37 are equally adjusted and if the machines 1 and 2 are being operated at lagging power factor, as generators, by suitable prime movers (not shown), the contacts of the regulators 8 and 9 will at first be assumed to be separated by an increase in reactive lagging K. V. A. taken by the load. This causes a reduction of the excitation of machines 1 and 2 which will cause the current in these machines to become less lagging, thereby decreasing the reactive or wattless power output of machines 1 and 2. The less lagging current will cause a decrease in the clockwise torques produced by all of the torque producing elements of the regulators 8 and 9. After a time the clockwise torques will balance the biasing torques and the main control contacts 12 and 13 will become stationary at the proper value of excitation sufficient to cause the predetermined degree of reactive power which is to be regulated. If now any change in reactive power occurs, the torque produced by the wattmetric devices will vary in the proper manner to change the excitation so as to restore reactive power to the regulated value. Thus, if the current becomes less lagging, thereby decreasing the reactive power, the wattmetric torque becomes weaker than the biasing torque which causes an increase in excitation and an increase in reactive power. If the current becomes more lagging, the above action is reversed.

By reversing the torque of the biasing means the system can be made to hold a reactive power which is caused by leading current in generators or a lagging current in motors.

The stabilizing action of devices 55 and 56 is due to their cumulative action, so that with the biasing torques and the torques of the main wattmetric devices fixed, the ratio of reactive power of machines 1 and 2 is fixed. By varying the individual bias, the ratio can be made anything desired.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, an alternating current circuit, a plurality of alternating current dynamo-electric machines connected in parallel to said circuit, individual regulators for each machine, wattmetric type actuating elements for controlling each regulator, connecting means for making said elements respond to the product of the current, voltage and a function of the phase angle between said quantities of said circuit, and additional individual wattmetric type actuating elements for controlling each regulator, said additional elements being connected to respond to the product of the current, voltage and a function of the phase angle between said quantities of each of said machines respectively.

2. In combination, an alternating current circuit, a plurality of dynamo-electric machines connected in parallel to said circuit, individual regulators for each machine, each of said regulators including an inductor armature member and two induction type wattmetric field members therefor, one of said field members of each regulator being connected to respond to the product of the current, voltage, and a function of phase angle between said quantities of its associated machine, the other two field members being connected to respond to the product of the current, voltage and a function of the phase angle between said quantities of said circuit.

3. In combination, an alternating current circuit, a plurality of alternating current dynamo-electric machines connected in parallel thereto, means responsive to the power factor of said circuit for regulating said machines so as to hold a substantially constant power factor on said circuit, and means responsive to the power factor of each machine for regulating each of said machines so that they will each operate at substantially constant power factor.

4. In combination, an alternating current circuit, a plurality of alternating current dynamo-electric machines connected in parallel thereto, individual regulators for each of said machines, means responsive to the power factor of said circuit for controlling each of said regulators, and means responsive to the power factor of each of said machines for also controlling their respective regulators.

5. In combination, an alternating current circuit, a plurality of alternating current dynamo-electric machines connected in parallel to said circuit, individual power factor regulators for said machines, said regulators having main control devices each including two wattmetric type actuating elements, means connecting one of said wattmetric type elements of each of said main control devices to said circuit so as to produce no torque at a given power factor on said circuit, and means connecting the remaining element of each regulator to produce no torque when the power factor of the machine controlled by its regulator is the same as said given power factor of said circuit.

6. In combination, an alternating current circuit, a plurality of synchronous dynamo-electric machines connected in parallel to said circuit, individual regulators for controlling the excitation of each machine respectively, separate means responsive to the power factor of said circuit for actuating each regulator, and separate means responsive to the power factor of each machine for actuating that machine's regulator, said two means for each regulator being adjusted to produce no actuating effect when the power factor is at a given value and to produce cumulative actuating effects if the power factor departs from said value.

7. In combination, an alternating current circuit, a plurality of alternating current dynamo-electric machines connected in parallel thereto, means for regulating said machines so as to hold a substantially constant value of reactive power flow in said circuit, and means for regulating each of said machines so that they each have a substantially constant value of reactive power.

8. In combination, an alternating current circuit, a plurality of alternating current dynamo-electric machines connected in parallel to said circuit, individual regulators for controlling the reactive power of said machines, said regulators having main control devices each including two wattmetric type actuating elements, means connecting one of said elements of each of said devices to said circuit so as to produce a given actuating effect corresponding to a given value of reactive power flow in said circuit, and means for connecting the remaining elements to be responsive to the reactive power in the machines controlled by the respective regulators in such a manner as to produce actuating effects which are cumulative with respect to the effects of the first elements.

9. In combination, an alternating current circuit, a plurality of alternating current dynamo-electric machines connected in parallel to said circuit, individual regulators for each machine, means for biasing each regulator in a given direction, and means on each regulator responsive to the reactive power of its associated machine and to the reactive power in said circuit for balancing said biasing means.

10. In combination, an alternating current circuit, a plurality of alternating current dynamo-electric machines connected in parallel to said circuit, individual regulators for each machine, means for biasing each regulator in a given direction, and means on each regulator responsive to the reactive power of its associated machine and to the reactive power in said circuit for acting cumulatively to oppose said biasing means.

KARL H. MAY.